May 9, 1950     C. E. TACK     2,507,062
BRAKE HEAD ARRANGEMENT
Filed Oct. 18, 1945
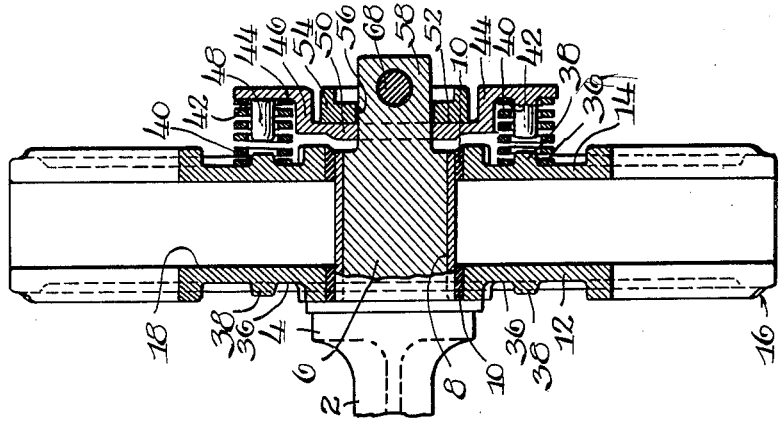
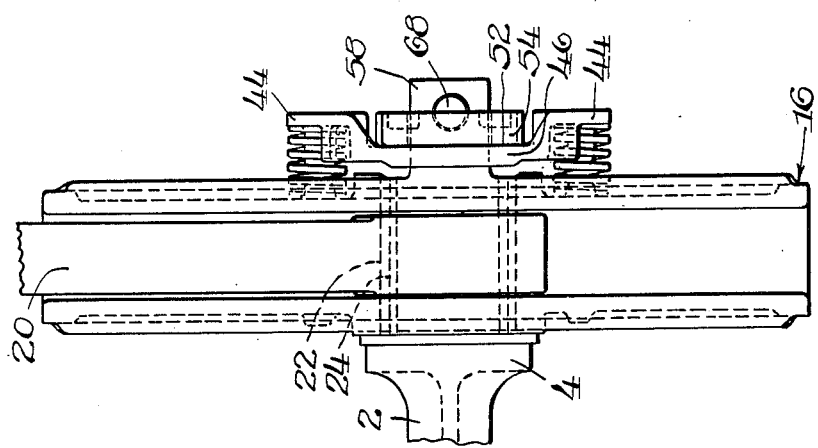
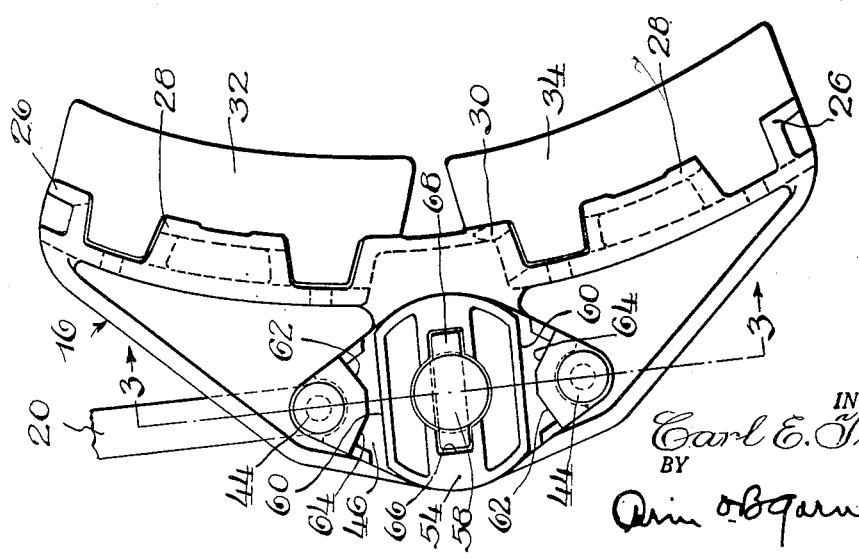
INVENTOR.
Carl E. Tack
BY
Orin O. B. Garner
Atty.

Patented May 9, 1950

2,507,062

UNITED STATES PATENT OFFICE 2,507,062

BRAKEHEAD ARRANGEMENT

Carl E. Tack, Chicago, Ill., assignor to American Steel Foundries, Chicago, Ill., a corporation of New Jersey Application October 18, 1945, Serial No. 623,031

13 Claims. (Cl. 188—221.1)

The present invention relates to brake rigging and particularly to a novel means of mounting the brake head on a brake beam.

The general object of the invention is to devise such a novel brake head mounting as will facilitate and simplify the manfacturing operation while at the same time meeting all the requirements of service conditions in which the brake head is required to be adjustably balanced with respect to an associated wheel.

A more specific object of my invention is to devise a brake head balancing arrangement wherein friction is developed between the brake head and a trunnion on the brake beam and securing means is mounted on the end of the trunnion in such manner as to eliminate the need for any threaded parts and simplify the operation of applying or dismantling the head and its associated parts with respect to the beam.

A more specific object is to so mount a brake head on the end of a beam as to permit limited rotation of said head with respect to said beam, said limited rotation being accomplished by means of a spring plate mounted to rotate with said head having cooperative relation with a washer fixed on the end of the beam and so related to said plate as to permit limited relative rotation of said plate and washer.

In the drawings:

Figure 1 is a side elevation of my novel brake head arrangement, only a fragmentary portion of the supporting hanger and brake beam being shown;

Figure 2 is a rear view of the structure shown in Figure 1; and

Figure 3 is a sectional view therethrough taken approximately in the plane of the hanger and as indicated by the line 3—3 of Figure 1, the hanger being omitted in this view.

My novel arrangement comprises the brake beam 2 having the annular shoulder at 4 defining one end of the trunnion 6, said trunnion having the bushing 8 affording convenient fitting with the bushings 10, 10 which may be mounted in aligned openings in the inboard wall 12 and the outboard wall 14 of the brake head, generally designated 16, said brake head having the usual hanger slot or opening 18 between said inboard and outboard walls where may be received the hanger 20, bushed as at 22 (Figure 2) for pivotal connection as at 24 with the trunnion end of the beam. The brake head 16 may have the usual end lugs 26, 26, intermediate lugs 28, 28 and central lug 30 providing support in usual manner through the medium of a key, or keys (not shown), for the upper and lower brake shoes 32 and 34.

Adjacent the trunnion opening in each wall of the head may be formed a spring seat at 36 with a spring-positioning lug 38 centrally formed thereon. Seated against the seats 36, 36 on the outboard wall 14 and positioned thereon by the lugs 38, 38 may be the springs 40, 40, the opposite ends of which seat as at 42, 42 against the spring seats 44, 44 formed at the upper and lower ends, respectively, of the spring plate 46. Each seat 44 may have an elongated lug 48 affording positioning means for the associated spring 40 and providing a stop by abutment with the opposite lug 38 limiting the compression of the spring 40. The spring plate 46, constituting one part of the friction assembly, may have a flat central portion 50 engaging as at 52 the complementary flat face of the washer 54, constituting the other part of the friction assembly, said plate and washer having aligned openings bored for a loose fit as at 56 with the cylindrical lug 58 centrally formed as an extension of the trunnion 6. The washer 54 may have top and bottom flanges defining flat faces at 60, 60 which may seat against stops 62, 62, or, alternately, 64, 64 formed on angularly arranged faces of the respective spring seats 44, 44 at the upper and lower ends of the spring plate 46. The washer 54 may also have a central channel or slot 66, well shown in the side view of Figure 1, within which may be received the securing pin 68 which may extend through an opening bored in the end of the lug 58, said pin thus acting as retaining means as well as serving to restrain the washer 54 against rotation with respect to the beam.

As the washer is restrained against such rotation with respect to the beam, the rotation of the head itself with respect to the beam will be restrained by the friction between the inboard wall of the head and the shoulder 4 at the end of the beam trunnion and a limiting stop for such rotation of the head on the beam will be provided by engagement of the faces 60, 60 of the washer 54 abutting, as before mentioned, at 62, 62 or 64, 64 the spring seat end portions of the plate 46. By this means, limited rotation of the head is permitted in either direction on the beam.

It may be observed that my novel arrangement may be assembled by positioning the springs 40, 40 and the spring plate 46 against the outboard face of the head after it is mounted on the trunnion end of the beam, then overcompressing the springs 40, 40 sufficiently to permit the washer 54 to be placed on the end of the lug 58 in such position as to permit placing the securing pin 68. The springs 40, 40 may then be permitted to snap back to their working height, in which position the securing pin 68 will be held firmly in the slot 66 and all working parts will be secured tightly in position.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake rigging, the combination of a brake beam having a flange defining a two-step trunnion portion, a brake head and hanger mounted on the first step of said trunnion portion with said head in frictional engagement with said flange, securing means for said head fixed on the second step of said trunnion portion, resilient means compressed between said securing means and said head, positioning means for said resilient means on said head and said securing means limiting the compression of said resilient means, said securing means comprising an inboard member having a recess receiving an outboard member, and a securing pin extending through the second step of said trunnion and recessed in said outboard member to prevent relative rotation thereof, said members having interengaging means limiting relative rotation thereof.

2. In a brake head balancing arrangement, a brake beam having a trunnion end, a brake head and hanger pivoted on said trunnion end with said head frictionally engaging a portion of said beam, and securing means for said head on said end of the beam comprising abutting outboard and inboard members sleeved over said end and axially movable thereon and capable of limited relative rotation with respect to each other, a securing pin positioned outboardly of said securing means and extending through said beam, and springs compressed between said means and said head and urging the former toward said pin and the outboard member thereof into abutment with said pin, said outboard member receiving said pin in a complementary recess therein, thus locking said pin with said beam and preventing disassembly of said pin with respect thereto, said securing means being normally spaced from said head to permit compression of said springs sufficiently to accommodate application and removal of said pin.

3. In a brake rigging, the combination of a brake beam having a flange defining a two-step trunnion portion, a brake head and hanger mounted on the first step of said trunnion portion with said head in frictional engagement with said flange, securing means for said head fixed on the second step of said trunnion portion, resilient means compressed between said securing means and said head, positioning means for said resilient means on said head and on said securing means limiting the compression of said springs, said securing means comprising an inboard member having a recess receiving an outboard member and a securing pin extending through the second step of said trunnion and recessed in said outboard member to prevent relative rotation thereof.

4. In a brake head balancing device, a brake head, a nonrotatable pivot member extending therethrough and having a shoulder frictionally engaging one side of said head, means for thrusting said head against said shoulder and for securing said head on said member comprising a pair of elements sleeved over said member at the opposite side of said head, resilient means compressed between said head and the adjacent of said elements, and a pin for maintaining said elements and head in assembled relation on said pivot member, said pin extending through said member and being received within a recess in the element remote from said head, the reaction of said resilient means against said elements maintaining said pin and last-mentioned element in abutment with each other whereby said pin is caused to remain in said recess, thereby preventing accidental disassembly thereof from said member.

5. In a brake assembly, a pivot member, a brake head thereon, securing means for said head extending transversely through said member, friction means mounted on said member between said head and said securing means, and resilient means between said friction means and said head urging the former against said securing means, said friction means overlapping said securing means to prevent disassembly thereof with respect to said member.

6. A brake head mounting comprising a brake head, a pivot element extending therethrough and having a flange frictionally engaging one side of said head, a spring plate and securing washer fitted on said element adjacent the opposite side of said head and axially movable on said element, stop means on said plate and washer limiting relative rotation thereof, a slot in said washer, a removable securing pin extending transversely of said element through an opening therein and received in said slot, abutment means on said washer at opposite ends of said slot engageable with the ends of said pin to prevent disassembly thereof with said element, and spring means compressed between said plate and said opposite side of said head for urging said head against said flange and for urging said washer into tight engagement with said pin, said washer and plate being movable toward said head against the resistance of said spring means to coincidentally remove said pin from said slot and disengage the pin from said abutment means during assembly and disassembly of said pin with said element.

7. A brake head mounting comprising a brake head, a pivot element extending therethrough, a surface on said element in frictional engagement with an inboard surface of said head, and means for securing said head on said element comprising inboard and outboard members sleeved on said element and movable axially thereof, said members being relatively rotatable on said element, a pin extending transversely of said element through a complementary opening therein, spring means compressed between the inboard member and the brake head for urging the latter against said surface and for urging the outboard member into tight engagement with said pin, said outboard member having abutment means engageable with said pin to prevent accidental disassembly thereof, said members being movable inboardly toward said head against the resistance of said spring means to disengage said abutment means from said pin during assembly and disassembly thereof with said element.

8. In a brake head mounting for an assembly comprising brake head and support members and a pivot element extending therethrough to afford a pivotal connection therebetween; the combination of a friction surface on said element engaging one side of said assembly, inner and outer relatively movable securing members carried by said element at the opposite side of said assembly, a removable pin extending through a transverse opening in said element and bearing against the outer securing member, spring means reacting against the inner member and said opposite side of said assembly for urging said assembly into said engagement with said surface and for urging said securing members toward said pin and engaging said outer securing member with said pin, one of said securing members carrying abutment means engageable with said pin to prevent accidental disassembly thereof from said opening, said securing members being movable axially of said element with respect to said assembly against the resistance of said spring means to move said abutment means out of cooperative relationship with said pin during assembly and disassembly thereof with said element.

9. In a brake head mounting for an assembly comprising brake head and support members and a pivot element extending therethrough to afford a pivotal connection therebetween; the combination of a friction surface on said element engaging one side of said assembly, inner and outer relatively movable securing members carried by said element at the opposite side of said assembly, a removable pin extending through a transverse opening in said element and bearing against the outer securing member, and spring means reacting against the inner securing member and said opposite side of said assembly for urging the latter into engagement with said surface and for urging said outer securing member into tight engagement with said pin, said outer securing member comprising abutment means engageable with said pin to prevent accidental disassembly thereof from said opening, said securing means being movable axially of said element with respect to said assembly against the resistance of said spring means to move said abutment means out of cooperative relationship with said pin during assembly and disassembly thereof with said element.

10. In a brake assembly, a pivot member, a brake head mounted thereon, abutment means on said member in frictional engagement with one side of said head, securing means for said head extending transversely through said member adjacent the opposite side of the head, friction means on said member between said head and said securing means, and resilient means between the head and the friction means for urging the head against said abutment means and said friction means against said securing means, said friction means overlapping said securing means to prevent disassembly thereof with respect to said member.

11. In a brake arrangement, a brake head, a pivot member extending therethrough and having a shoulder in frictional engagement with one side thereof, securing means for said head disposed at the opposite side thereof and extending transversely through said member, a friction assembly between the head and said securing means overlapping the latter to prevent disassembly thereof with respect to said member, and resilient means between the head and said friction means for urging the head against the shoulder and said friction means against said securing means, said friction means comprising a pair of abutting plates, one of which is engaged by said resilient means and is rotatable with the head, and the other of which is locked against rotation with the securing means.

12. In a brake head balancing device, an assembly comprising brake and support members, spaced rigid means on one of said members, rigid means on the other member disposed between said spaced rigid means, an element extending through all of said rigid means and affording a pivotal connection between said members, said element having a portion at one side of said assembly frictionally engaging one of said spaced rigid means, inner and outer relatively movable securing members carried by said element at the opposite side of said assembly, a removable pin extending through a transverse opening in said element and bearing against the outer securing member, and spring means reacting against the inner securing member and the other of said spaced rigid means for urging the last-named rigid means into said engagement with said portion and for urging said outer securing member into tight engagement with said pin, said outer securing member carrying abutment means engageable with the ends of said pin to prevent accidental disassembly thereof from said opening, said securing members being movable axially of said element with respect to said assembly against the resistance of said spring means to move said abutment means out of cooperative relationship with said pin during assembly and disassembly thereof with said element.

13. In a brake arrangement, a pivot element, a brake head mounted thereon, securing means for the head extending transversely of said element through an opening therein, rigid means mounted on said element between the head and said securing means, said rigid means comprising a member in abutment with said securing means and overlapping the ends of said securing means to prevent disassembly thereof with respect to said element, and resilient means between said head and said rigid means for urging the latter against said securing means.

CARL E. TACK.

REFERENCES CITED

The following references are of record in the file of this patent:

UNITED STATES PATENTS

| Number | Name | Date |
| --- | --- | --- |
| 2,281,535 | Drews | Apr. 28, 1942 |

FOREIGN PATENTS

| Number | Country | Date |
| --- | --- | --- |
| 273,064 | Great Britain | June 30, 1927 |